United States Patent [19]

Imai et al.

[11] Patent Number: 4,529,052

[45] Date of Patent: Jul. 16, 1985

[54] CONVEYOR TRUCK

[75] Inventors: Hiroshi Imai; Keiji Takeuchi; Kenichi Azuma; Hironori Ozaki, all of Hyogo, Japan

[73] Assignee: Mitsubishi Denki Kabushiki Kaisha, Tokyo, Japan

[21] Appl. No.: 643,930

[22] Filed: Aug. 24, 1984

[30] Foreign Application Priority Data

Aug. 25, 1983 [JP] Japan .................................. 58-155271
Dec. 23, 1983 [JP] Japan .................................. 58-243211

[51] Int. Cl.$^3$ ............................................. B62D 61/10
[52] U.S. Cl. ....................................... 180/6.48; 180/23
[58] Field of Search ................... 180/6.48, 6.5, 23, 24

[56] References Cited

U.S. PATENT DOCUMENTS 3,827,517  8/1974  Williamson ...................... 180/6.48
4,078,630  3/1978  Krieg .............................. 180/6.5 X
4,221,273  9/1980  Finden ............................. 180/6.48

Primary Examiner—Robert G. Nilson

[57] ABSTRACT

A conveyor truck including a truck body and a plurality of rotary members rotatably mounted on the truck body in a plane parallel to the floor. A pair of drive wheels, rotatable by aligned rotary shafts lying in a plane parallel to the floor, are mounted on each rotary member. The rotation of each drive wheel can be independently controlled. Supports are mounted on the respective rotary members and are arranged generally perpendicular to the rotary shafts of the drive wheels. The supports support the drive wheels so as to rotate about the center axes of the respective rotary members and parallel to the floor, whereby the conveyor truck can smoothly move in any direction without reorientation of the truck body.

14 Claims, 14 Drawing Figures

CONVEYOR TRUCK

BACKGROUND OF THE INVENTION

This invention relates to a conveyor truck having improved running characteristics.

A conventional conveyor truck of the same general type to which the invention pertains is shown in FIGS. 1 and 2. FIG. 1 is a bottom view of the conventional conveyor truck and FIG. 2 is a plan view of the same. Reference numerals 1 and 2 designate a truck body and wheels, respectively; 3, blocks for supporting rotary shafts of the wheels 2; 4 and 5, a motor and a power transmission mechanism, respectively, for imparting power to the wheels 2; 6, auxiliary wheels secured to the truck body 1; and 7, a load-supporting bed.

In operation, rotational movement of the two motors 4 is imparted by the power transmission mechanism to the wheels 2 for causing movement of the truck body 1. During the running of the truck, the auxiliary wheels 6 serve to support the truck body 1 without interfering with the running thereof.

The modes in which the truck can be run may be classified into two groups. One is a rectilinear running mode in which the truck is advanced and retracted along the same straight line as that in which the truck is oriented. The other mode is a curvilinear running mode including curve running and turning about a fixed point in which the truck is run about a point on an extension of the axis of rotation of the two wheels 2. FIG. 3 shows the manner in which the truck is rectilinearly run, whereas FIGS. 4 and 5 illustrate the manner in which the truck is curvilinearly run, wherein arrows indicate the direction in which the truck is advanced.

Rectilinear running of the truck is obtained by driving the two motors 4 via the power transmission mechanism 5 to synchronously rotate the two wheels at the same speed and in the same direction. On the other hand, the curvilinear running of the truck is attained by controlling the rotational speeds of the two motors 4 in such a manner that the ratios of the distances between the centers of curvature of the running loci of the two wheels to the rotational speeds of the two wheels is maintained at a specified value.

According to the conventional conveyor truck constructed as aforementioned, a complicated sequence of combinations of rectilinear and curvilinear runnings is required, for instance, if it is desired to move the truck along spaced parallel lines. This involves certain disadvantages since the orientation of the truck must be changed a plurality of times, making subsequent alignment of the truck with the original orientation impossible. Also, a wide space is required for movement of the truck.

SUMMARY OF THE INVENTION

The present invention is provided to eliminate the aforementioned defects in the conventional conveyor truck.

Specifically, the invention provides a conveyor truck which comprises a plurality of rotary members supported on a truck body and rotatable in a plane parallel to the floor, a pair of drive wheels mounted on each of the rotary members and rotatable by rotary shafts mounted in a plane parallel to the floor, the rotational speed of the drive wheels being independently controlled, and support means mounted on the rotary members and arranged perpendicular to the rotary shafts of the drive wheels for supporting the drive wheels and rotating the latter about the center of an axis parallel to the floor, whereby the truck may be transversely and diagonally moved and stably run without difficulty and wasted movements.

Further, the invention provides a conveyor truck which comprises rotary members supported on a truck body and rotatable in a plane parallel to the running surface of the truck, detector means for detecting rotational angles of the rotary members with respect to the truck body, a pair of drive wheels with rotary shafts mounted parallel to the running surface of the truck, the rotational speeds of the drive wheels being independently controlled, and control means for controlling the rotational speed of each of the drive wheels according to a signal outputted from the detector means, whereby the truck may be accurately moved in desired directions, such as lateral and diagonal directions, without the need for reorientation of the truck body.

DESCRIPTION OF THE PREFERRED EMBODIMENTS

Figure 1:
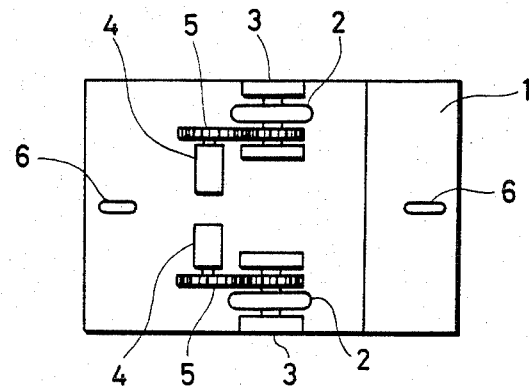
FIGS. 1 and 2 are bottom and plan views of a conventional conveyor truck.
Figure 2:
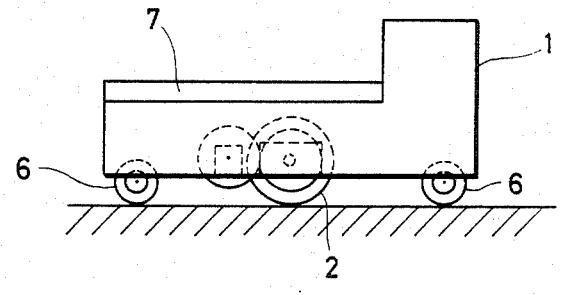
Figure 3:
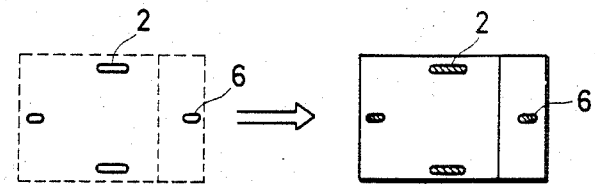
FIG. 3 is a representation explanatory of a rectilinear running locus of the conventional conveyor truck.
Figure 4:
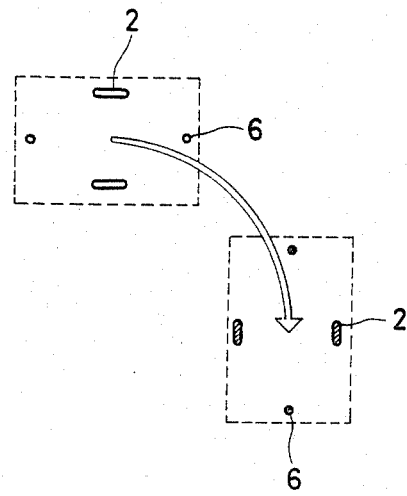
FIGS. 4 and 5 are views explanatory of a curvilinear running locus of the conventional conveyor truck.
Figure 5:
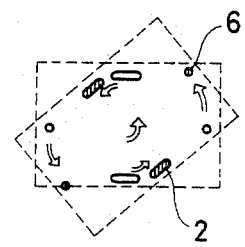
Figure 6:
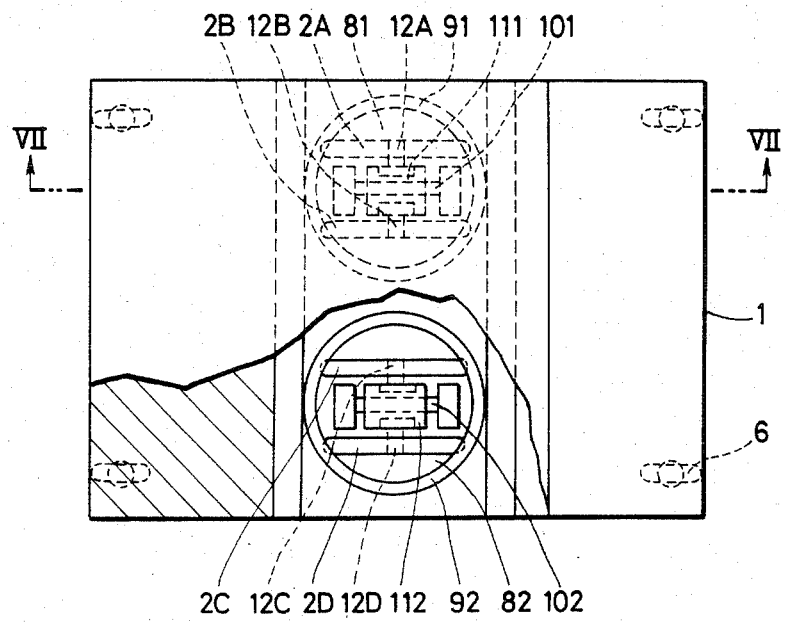
FIGS. 6 and 7 are, respectively, a fragmentary sectional view of a conveyor truck constructed in accordance with a first embodiment of the invention and a cross-sectional view taken along a line VII—VII in FIG. 6.
Figure 7:
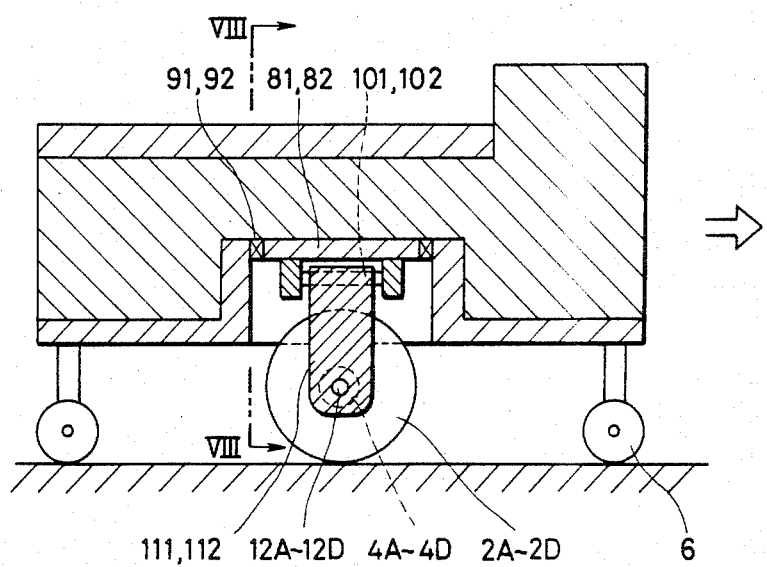
Figure 8:
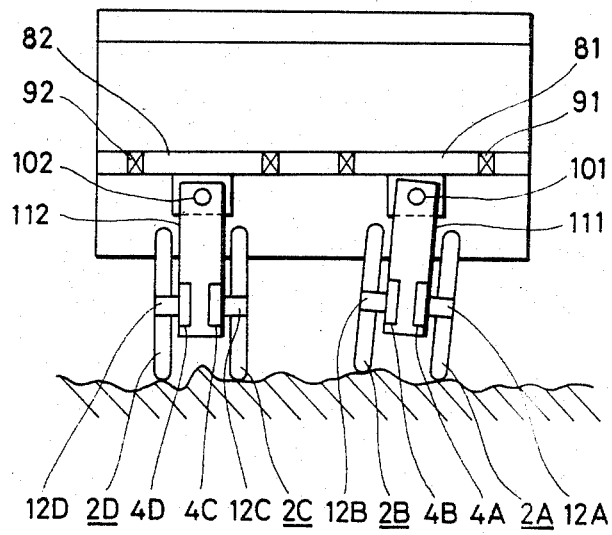
FIG. 8 is a cross-sectional view taken along a line VIII—VIII in FIG. 7.
Figure 9:
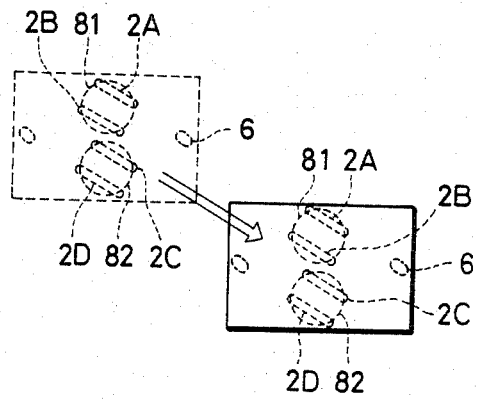
FIGS. 9 and 10 are views explanatory of rectilinear and curvilinear running loci of the conveyor truck of the first embodiment of the invention.

A preferred embodiment of the invention will be now explained in conjunction with the accompanying drawings. In FIGS. 6, 7 and 8, reference numerals 81 and 82 designate rotary members rotatably supported on a truck body 1. In this instance, the rotary members are two in number and equidistantly separated from the center of the axis of symmetry of the truck body 1. Reference numeral 91 and 92 indicate bearings, the inner and outer races of which are fitted to the rotary members 81 and 82 and the truck body 1, respectively. The rotary members 81 and 82 are rotatable in a plane parallel to the floor. Drive wheel pairs 2A, 2B and 2C, 2D are disposed at positions symmetrical with respect to the centers of rotation of the respective rotary members 81 and 82. Rotary shafts 12A and 12B of the drive wheels 2A and 2B are disposed on the same straight line. Similarly, rotary shaft 12C and 12D of the drive wheels 2C and 2D are aligned in the same manner.

Reference numerals 4A, 4B, 4C and 4D indicate motors used exclusively for the drive wheels 2A, 2B, 2C and 2D, respectively, and which are directly coupled to the drive rotary shafts. The rotations of the drive wheels 2A to 2D can thus be independently controlled by the motors 4A to 4D, respectively. The drive wheel pairs 2A, 2B, and 2C, 2D are supported on the respective rotary members 81 and 82, for instance, by shafts 101 and 102 and holders 111 and 112. The shafts 101 and 102 are arranged perpendicular to the rotary shafts 12A, 12B and 12C, 12D, respectively, and to parallel the floor, and the drive wheel pairs 2A, 2B and 2C, 2D are in turn mounted on the holders 111 and 112, rotatably about the shafts 101 and 102, respectively. The drive wheels 2A and 2B are supported as aforementioned so that the corresponding rotary shafts 12A and 12B thereof rotate in a plane parallel to the floor upon rotation of the rotary member 81. This is also the case with the rotary shafts 12C and 12D.

The operation of the truck will be apparent from the following description. The rotary member 81 to which the drive wheels 2A and 2B are attached is adapted to synchronously rotate the drive wheels 2A and 2B parallel to the floor at the same speed and in reverse directions, and is itself rotatable in the bearing 91 without applying any external force to the truck body 1. With this rotation, the steering direction of the drive wheels 2A and 2B is determined by the angular orientation of the rotary member 81. The holder 111 is rotated about the shaft 101 if unevenness in the floor is encountered so that the drive wheels 2A and 2B are always in contact with the floor. The drive wheels 2C and 2D can be steered in the same manner.

Rectilinear running of the truck will now be described. The drive wheel pairs 2A, 2B and 2C, 2D are set parallel to one another by selectively rotating the drive wheels to align the directions of the rotary members 81 and 82. In other words, all four drive wheels 2A to 2D are arranged to be steered in the same direction. Next, when the four motors 4A to 4D are driven to synchronously rotate the four drive wheels 2A to 2D in the same direction and at the same speed, the truck body 1 is rectilinearly run in the steered directions (arrow) of the drive wheels 2A to 2D. In this instance, the direction in which the truck is rectilinearly run may be set irrespective of the orientation of the truck body itself.

Figure 10:
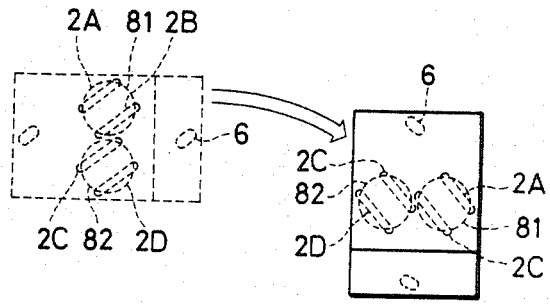

For curvilinear running, the rotations of the respective drive wheels 2A to 2D are controlled such that lines extended from and parallel to the rotary shafts 12A to 12D of the drive wheel pairs 2A, 2B and 2C, 2D intersect at the center of curvature of the desired curvilinear path. The rotary members 81 and 82 are oriented to orient the rotary shafts 12A to 12D accordingly. Then, rotations of the respective drive wheels 2A to 2D are controlled according to the distance from the center of curvature to the respective drive wheels 2A to 2D so that the truck is curvilinearly run along the desired path, as shown in FIG. 10. In this instance, the center of curvature may be selected without restriction by the running direction, initial position and the like of the truck body. The drive wheels are rotatably supported so that all wheels are always in contact with the floor, and so that the driving force derived from rotation of the respective wheels is positively used to permit the truck to run over an uneven floor.

Figure 11:
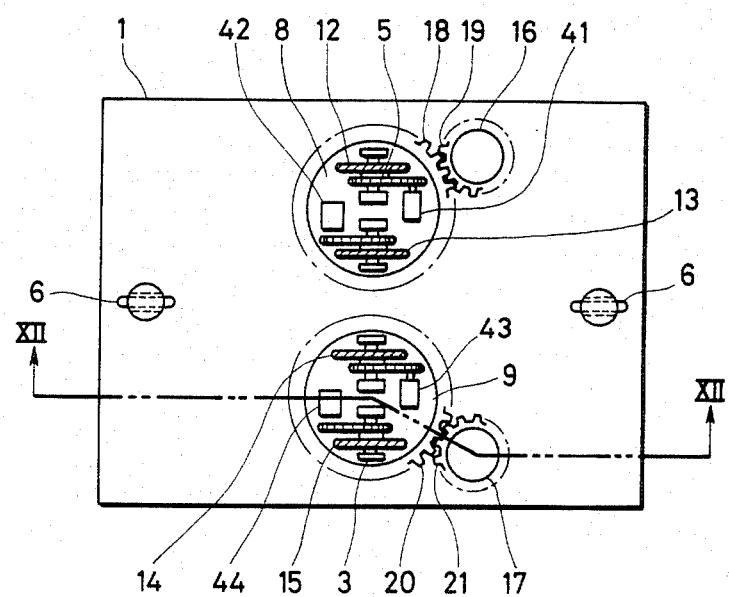
FIGS. 11 and 12 are, respectively, a bottom and a sidewise cross-sectional view showing a conveyor truck constructed in accordance with a second embodiment of the invention, with FIG. 12 being taken along a line XII—XII in FIG. 11.
Figure 12:
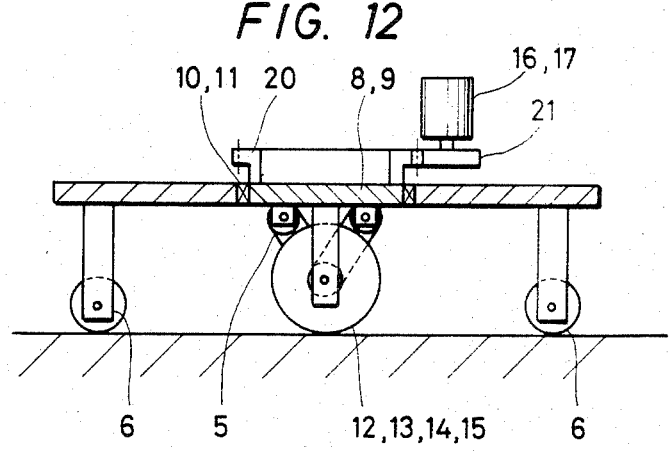

Another embodiment of the invention will be described by reference to FIGS. 11 and 12. FIG. 11 is a bottom view of the conveyor truck of the second embodiment of the invention. FIG. 12 is a sectional view taken along a line XII—XII in FIG. 11.

Reference numerals 8 and 9 are rotary members supported on the truck body 1. In this instance, the rotary members are two in number, equidistantly separated from the axis of symmetry of the truck body 1. Reference numerals 10 and 11 indicate bearings, the inner and outer races of which are fitted to the rotary members 8 and 9 and the truck body 1, respectively. The rotary members 8 and 9 are rotatable in a plane parallel to the running surface of the truck. Drive wheel pairs 12, 13 and 14, 15 are mounted on the rotary members 8 and 9 and are independently rotatable by respective motors 41, 42, 43 and 44 provided exclusively therefor. The drive wheels 12 and 13 attached to the rotary member 8 include aligned rotary shafts mounted parallel to the running surface of the truck. The rotary shafts are rotatable in a plane parallel to the running surface of the truck. This is also the case with the rotary member 9 and the components associated therewith. Reference numerals 16 and 17 indicate detector units used for detecting the rotational angles of the rotary members 8 and 9 with respect to the truck body 1. The detector units are coupled to the rotary members 8 and 9 via measuring gear pairs 18, 19 and 20, 21, respectively. Rotary encoders may be used as the detector units.

The steering of the truck is as follows. The rotary member 8 to which the drive wheels 12 and 13 are attached is adapted to synchronously rotate the drive wheels 12 and 13 at the same speed and in angularly opposite directions, and is rotatable in the bearing 10 without applying any external force to the truck body 1. With this rotation, the drive wheels 12 and 13 may be oriented with respect to the truck body 1 at any angle. The rotational angle of the rotary member 8 relative to the truck body 1 is continuously detected by the rotary encoder 16 through the measuring gears 18 and 19, and this rotational angle of the rotary member 8 is controlled by controlling the respective motors 41 and 42 using a feedback control loop employing a signal outputted from the rotary encoder 16.

Figure 13:
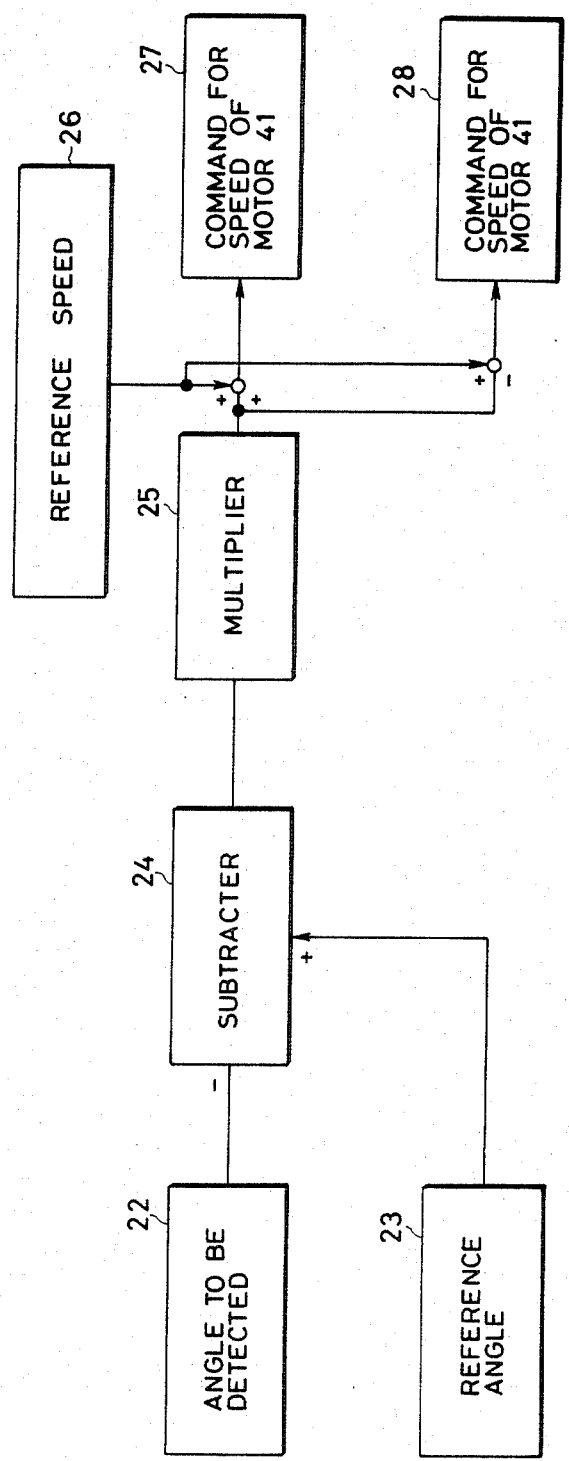
FIG. 13 is a block diagram showing a control device which may be used with the invention.

FIG. 13 is a block diagram showing a control device which may be used for performing the required control action. Reference numeral 22 indicate a register in which is stored the value of the rotational angle of the rotary member 8 outputted by the rotary encoder 16; 23, a register for storing a reference angle corresponding to the desired rotational angle of the respective rotary member 8; 24 and 25, a subtracter and multiplier which form a difference in the rotational angle of the rotary member from the desired direction and multiple the difference by a constant; 26, is a register storing a value indicative of a reference speed; and 27 and 28, command generators for instructing speeds of the motors 41 and 42 to correct for deviation between the reference angle and present actual angle of the rotary member 8 to thus steer the rotary member 8 in the desired direction. The rotational position of the rotary member 9 may be controlled in the same manner. Accordingly, the rotary members 8 and 9 are accurately oriented to thus steer the drive wheels pairs 12, 13 and 14, 15 in the desired direction.

Figure 14:
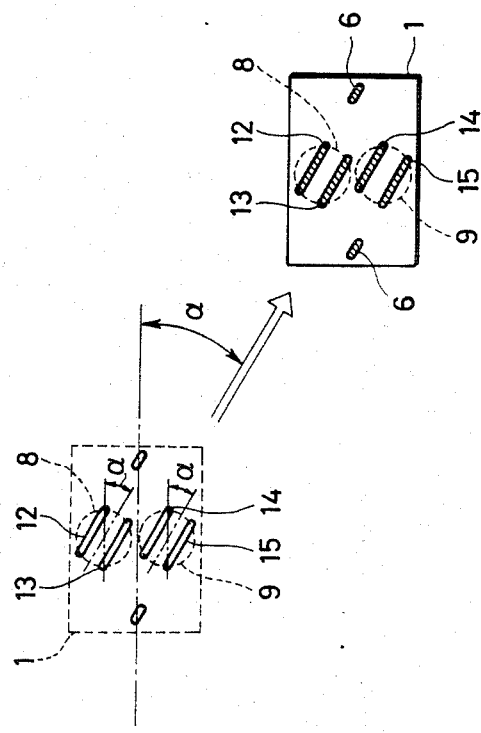
FIG. 14 is a view explanatory of a locus of movement of a conveyor truck of the invention.

FIG. 14 is a diagram explanatory of a locus of movement of the conveyor truck embodying the invention. For example, when the conveyor truck is to be moved at an angle of $\alpha$ with the truck body 1 remaining oriented at 0°, the rotary members 8 and 9 are oriented at the angle of α, whereby all of the drive wheels 12, 13, 14 and 15 are oriented in the same direction. Thereafter, the drive wheels 12, 13, 14 and 15 are synchronously rotated in the same direction and at the same rotational speed. This moves the conveyor truck at the angle of α without reorientation of the truck body 1. During this movement, if, for instance, one of the drive wheels 12 and 13 should fail to maintain synchronism with the other of the drive wheels 12 and 13 due to slippage or the like, the rotary member 8 is rotated to shift the orientations of the drive wheels 12 and 13 from the angle of α. However, this deviation is detected by the rotary encoder through the measuring gears 18 and 19 so that the orientation of the rotary member 8 is promptly returned to the angle of α by providing correction to the rotational speeds of the drive wheels 12 and 13. The drive wheels 14 and 15, the rotary member 9, the measuring gears 20 and 21, and the rotary encoder 7 are controlled in the same manner. Accordingly, deviation from the desired direction in which the rotary members 8 and 9 should be oriented is minimized so that the conveyor truck is accurately moved in the desired direction.

Although the aforementioned embodiments have been described as employing two sets of rotary members and drive wheels, more than two sets may be employed if desired. In such a case, the auxiliary wheel 6 is not necessarily required. The position where the rotary members are mounted on the truck body is not limited to what is illustrated in the aforementioned embodiment. Also, the supporting arrangement for the drive wheels on the rotary members is not limited to what is described in relation to the aforementioned embodiment.

We claim:

1. A conveyor truck comprising:
   (a) a truck body;
   (b) a plurality of rotary members supported on said truck body and rotatable in a plane parallel to a running surface of said truck;
   (c) a pair of drive wheels mounted on each of said rotary members and fixed to aligned rotary shafts disposed parallel to said running surface, said drive wheels being independently rotatable;
   (d) independent drive means for controllably driving each of said drive wheels to selectively orient said rotary members with respect to said truck body and to move said truck body; and
   (e) support means coupling said rotary members to said rotary shafts of said drive wheels, said support means supporting said drive wheels as to be rotatable in a plane parallel to said running surface.

2. The conveyor truck of claim 1, wherein said support means comprises members for supporting respective rotary shafts of said drive wheels, and shafts extending perpendicular to said rotary shafts of said drive wheels and parallel to said running surface for rotatably supporting said support members.

3. The conveyor truck of claim 2, wherein said rotary shafts of said drive wheels are disposed on opposite sides each of said support members, and wherein said drive wheels are arranged on opposite sides of each of said support members.

4. The conveyor truck of claim 1, wherein said rotary members are two in number and are separated equidistantly from a plane of symmetry of said truck.

5. The conveyor truck of claim 4, wherein said rotary members are two in number and are mounted adjacent a center of said truck body.

6. The conveyor truck of claim 1, wherein said two drive wheels mounted on each of rotary members are each disposed symmetrically with respect to a center of rotation of said rotary members.

7. The conveyor truck of claim 1, wherein each of said rotary members comprises a disc rotatably mounted to an underside of said truck body.

8. The conveyor truck of claim 7, further comprising a bearing supporting each of said rotary members on said truck body, each said bearing comprising an inner race fitted to a circumference of said rotary member and an outer race fitted to said truck body.

9. The conveyor truck of claim 1, wherein said drive means are directly coupled to respective rotary shafts of said drive wheels.

10. The conveyor truck of claim 1, further comprising a plurality of transmission mechanisms, said drive means being mounted independently on said rotary members to impart driving forces to respective ones of said drive wheels through respective ones of said transmission mechanisms.

11. A conveyor truck comprising:
    (a) a truck body;
    (b) a plurality of rotary members supported on said truck body and rotatable in a plane parallel to a running surface of said truck;
    (c) a pair of drive wheels mounted on each of said rotary members and fixed to aligned rotary shafts disposed parallel to said running surface, said drive wheels being independently rotatable;
    (d) independent drive means for controllably driving each of said drive wheels to selectively orient said rotary members with respect to said truck body and to move said truck body; and
    (e) detector means for detecting rotational angles of said rotary members with respect to said truck body; and
    (f) control means for controlling rotational speeds each of said drive wheels in response to signals outputted by said detector means.

12. The conveyor truck of claim 11, further comprising gear means for driving said detector means by said rotary members.

13. The conveyor truck of claim 11, wherein said detector means comprises a rotary encoder.

14. The conveyor truck of claim 11, wherein said control means comprises means for comparing rotational angles of said rotary members with specified angles to calculate a deviation therebetween, and means for applying driving signals to each of said drive wheels in accordance with said deviation.

* * * * *